United States Patent
Taplin

(10) Patent No.: US 7,526,884 B2
(45) Date of Patent: May 5, 2009

(54) SEDIMENT REMOVAL APPARATUS

(76) Inventor: Steven B Taplin, 10050 Taplin La., Plainwell, MI (US) 49080

( * ) Notice: Subject to any disclaimer, the term of this patent is extended or adjusted under 35 U.S.C. 154(b) by 529 days.

(21) Appl. No.: 11/340,142

(22) Filed: Jan. 26, 2006

(65) Prior Publication Data

US 2009/0084735 A1   Apr. 2, 2009

Related U.S. Application Data

(60) Provisional application No. 60/647,309, filed on Jan. 26, 2005.

(51) Int. Cl.
E02F 3/88 (2006.01)

(52) U.S. Cl. .............. 37/321; 37/317; 37/323; 37/344

(58) Field of Classification Search ............ 37/307, 37/313, 317, 321, 322, 323, 344; 405/128.25
See application file for complete search history.

(56) References Cited

U.S. PATENT DOCUMENTS

| | | | |
|---|---|---|---|
| 3,543,422 A * | 12/1970 | Plutchak | ............ 37/318 |
| 3,638,432 A | 2/1972 | Schoonmaker | |
| 3,642,129 A | 2/1972 | McDaniel et al. | |
| 3,646,694 A | 3/1972 | Beck, Jr. | |
| 3,815,267 A | 6/1974 | Laarman | |
| 3,841,710 A | 10/1974 | Boland et al. | |
| 4,160,734 A | 7/1979 | Taylor et al. | |
| 4,253,255 A | 3/1981 | Durell | |
| 4,323,424 A | 4/1982 | Secunda et al. | |
| 4,346,937 A | 8/1982 | Latimer et al. | |
| 4,376,048 A | 3/1983 | Kovacs | |
| 4,600,338 A | 7/1986 | Van Bruwaene et al. | |
| 4,750,279 A * | 6/1988 | Hofland | ............ 37/313 |
| 4,816,167 A | 3/1989 | Vanderslice | |
| 4,979,322 A * | 12/1990 | Sloan | ............ 37/322 |
| 5,016,717 A | 5/1991 | Simons et al. | |
| 5,115,751 A | 5/1992 | Copson | |
| 5,172,497 A | 12/1992 | Lemonds et al. | |
| 5,240,608 A | 8/1993 | Gurfinkel et al. | |
| 5,364,208 A | 11/1994 | Taguchi | |
| 5,491,913 A | 2/1996 | Hutchinson | |
| 5,507,601 A | 4/1996 | Taguchi | |

(Continued)

OTHER PUBLICATIONS

Photo of sediment removal apparatus used more than one year prior to Jan. 26, 2005.

*Primary Examiner*—Gary S Hartmann
(74) *Attorney, Agent, or Firm*—Van Dyke, Gardner, Linn & Burkhart, LLP

(57) ABSTRACT

A sediment removal system and method provides a versatile and controllable device for removing sediment from water in a focused manner that avoids generating unwanted turbidity. A suction pump draws water and sediment through a suction conduit and the injection of air into the suction conduit by air nozzles enables sediment to be removed from greater depths. The inclusion of water nozzles on an inlet opening enables hardened sediment to be dislodged such that it may be drawn into the suction conduit. A GPS receiver mounted to the suction conduit enables the location of the removal process to be tracked and a knife valve prevents backflow out of the suction conduit. The capturing of solid sediment by retention containers and the capturing of water containing suspended sediment by a tank enables the sediment and water to be transported to an appropriate location for treatment or disposal.

7 Claims, 7 Drawing Sheets

U.S. PATENT DOCUMENTS

| | | |
|---|---|---|
| 5,544,983 A | 8/1996 | Taguchi |
| 5,599,137 A | 2/1997 | Stephenson et al. |
| 5,603,171 A | 2/1997 | Steinkühler |
| 5,642,576 A | 7/1997 | Chrisman |
| 5,688,076 A | 11/1997 | Atkins |
| 5,810,512 A | 9/1998 | Kateley |
| 5,814,230 A | 9/1998 | Willis et al. |
| 5,840,102 A | 11/1998 | McCracken |
| 5,860,767 A | 1/1999 | Atkins |
| 5,942,161 A | 8/1999 | Pate |
| 6,082,548 A | 7/2000 | Stephenson et al. |
| 6,112,439 A | 9/2000 | Rinker |
| 6,125,560 A | 10/2000 | Beaumont |
| 6,149,345 A | 11/2000 | Atkins |
| 6,189,243 B1 * | 2/2001 | Oikawa ....................... 37/317 |
| 6,343,559 B1 | 2/2002 | Thomas |
| 6,374,519 B1 | 4/2002 | Beaumont |
| 6,432,303 B1 | 8/2002 | Chesner et al. |
| 6,450,775 B1 | 9/2002 | Hutchinson et al. |
| 6,484,422 B1 * | 11/2002 | Bain et al. ..................... 37/323 |
| 6,558,550 B1 | 5/2003 | Kelly |
| 6,592,754 B2 | 7/2003 | Chilibeck |
| 6,691,436 B2 * | 2/2004 | Chizek, Sr. .................. 37/322 |
| 7,234,252 B2 * | 6/2007 | Jarnecke et al. ............... 37/322 |
| 7,370,445 B2 * | 5/2008 | Mijatovic .................... 37/318 |
| 2002/0133983 A1 | 9/2002 | Chesner et al. |
| 2002/0189139 A1 * | 12/2002 | Buckner ...................... 37/317 |
| 2002/0194753 A1 * | 12/2002 | Bain et al. ..................... 37/317 |
| 2003/0000114 A1 | 1/2003 | Thomas |
| 2003/0041483 A1 | 3/2003 | Redding |
| 2003/0154634 A1 | 8/2003 | Thomas |
| 2004/0010947 A1 * | 1/2004 | Hutchinson et al. ........... 37/317 |

* cited by examiner

SEDIMENT REMOVAL APPARATUS

CROSS REFERENCE TO RELATED APPLICATION

The present application claims priority of U.S. provisional application Ser. No. 60/647,309, filed Jan. 26, 2005, by Steven B. Taplin for SEDIMENT REMOVAL APPARATUS AND METHOD FOR REMOVING SEDIMENT FROM OPEN WATERWAYS, which is hereby incorporated herein by reference in its entirety.

BACKGROUND OF THE INVENTION

The present invention relates to the removal of sediment from bodies of water, and in particular to a sediment removal method and system that removes sediment from significant depths while limiting or avoiding turbidity.

Methods of removing sediment from bodies of water exist, however, such known methods of removal often include undesirable side effects. For example the equipment and process of dredging generates significant turbidity in that the sediment is openly disturbed from its settled condition. Such disruption to the sediment bed causes portions of the sediment to become suspended in the water. This is undesirable, particularly when the sediment is contaminated, as the level of contamination in the water is increased. Furthermore, dredging processes, such as cutter head dredging, are inefficient in that a much greater percentage of water is removed as compared to sediment. Cutter head dredging is also an unfocused or less controlled process in that the equipment is not easily maneuvered and, therefore, also susceptible to damage from submerged objects.

Therefore an apparatus is needed that enables controlled removal of sediment while avoiding turbidity.

SUMMARY OF THE INVENTION

The present invention is embodied in a sediment removal system for removing sediment from bodies of water, where the system is able to remove sediment from depths greater than twenty-nine feet and in a controlled manner such that the generation of unwanted turbidity is minimized.

According to one aspect of the present invention, a method of removing sediment from a flowing waterway comprises movably supporting a suction conduit that has an inlet portion and an inlet opening over the waterway with a support device, inserting the inlet portion of the suction conduit into the water such that the inlet opening of the inlet portion is located near a sediment bed, injecting air into a flow path of the inlet portion with at least one air nozzle located on the inlet portion, the air nozzle being supplied with air from an air supply device, and drawing water and sediment using a suction pump through the suction conduit and through at least one retention container, the retention container being adapted to retain sediment removed from a flowing waterway.

According to another aspect of the present invention, a sediment removal system for removing sediment from a body of water comprises a suction conduit having an inlet portion defining an inlet opening, at least one retention container adapted to retain sediment removed from a body of water, a suction pump adapted to draw sediment and water through the suction conduit and into the at least one retention container, and a moveable crane that has a base, a boom, and at least one support member supported by the boom, the base of the crane being located on land. The at least one support member is of a predetermined length and securable to the suction conduit such that the suction conduit is not directly supported by the base and the inlet portion is selectively positionable within the water. The sediment removal system further includes an air supply device, and at least one air nozzle that is located on the inlet portion and adapted to inject air from the air supply device into a flow path of the suction conduit.

According to another object of the present invention, a sediment removal system for removing sediment from a body of water comprises a suction conduit having an inlet portion and an inlet opening, at least one retention container adapted to retain sediment removed from a body of water, a suction pump adapted to draw sediment and water through the suction conduit and into the at least one retention container, and a floating vessel operable to support the suction conduit such that the inlet portion is selectively positionable within the water. The sediment removal system further includes an air supply device and at least one air nozzle that is located on the inlet portion and adapted to inject air from the air supply device into a flow path of the suction conduit.

According to another object of the present invention, a sediment removal system for removing sediment from a body of water comprises a suction conduit having an inlet portion and an inlet opening, at least one retention container adapted to retain sediment removed from a body of water, a suction pump, the suction pump adapted to draw sediment and water through the suction conduit and into the at least one retention container, and a moveable gantry adapted to movingly support the suction conduit such that the inlet portion is selectively positionable within the water. The sediment removal system further includes an air supply device and at least one air nozzle that is located on the inlet portion and adapted to inject air from the air supply device into a flow path of the suction conduit.

According to another object of the present invention, a sediment removal system for removing sediment from a body of water comprises a suction conduit having an inlet portion and an inlet opening, at least one retention container adapted to retain sediment removed from a body of water, a suction pump adapted to draw sediment and water through the suction conduit and into the at least one retention container, and a support device adapted to movingly support the suction conduit such that the inlet portion is selectively positionable within a body of water. The sediment removal system further includes an air supply device, at least one air nozzle, a water pump, and at least one water nozzle. The at least one air nozzle is located on the inlet portion and is adapted to inject air from the air supply device into a flow path of the suction conduit. The at least one water nozzle is affixed to the inlet portion near the inlet opening, and the water pump and water nozzle are operable to discharge pressurized water directed at a sediment bed.

The sediment removal system of the present invention provides a versatile and controllable device for removing sediment from water in a focused manner that avoids generating unwanted turbidity. A suction pump draws water and sediment through a suction conduit and the injection of air into the suction conduit by air nozzles enables sediment to be removed from greater depths by providing additional lift to the column of water. The inclusion of water nozzles on an inlet opening enables hardened sediment to be dislodged such that it may be drawn into the suction conduit. A GPS receiver mounted to the suction conduit enables the location of the removal process to be tracked and a knife valve prevents backflow out of the suction conduit. The capturing of solid sediment by retention containers and the capturing of water containing suspended sediment by a tank enables the sediment and water to be transported to an appropriate location for treatment or disposal.

These and other objects, advantages, purposes and features of the present invention will become apparent upon review of the following specification in conjunction with the drawings.

DESCRIPTION OF THE PREFERRED EMBODIMENT

Figure 1:
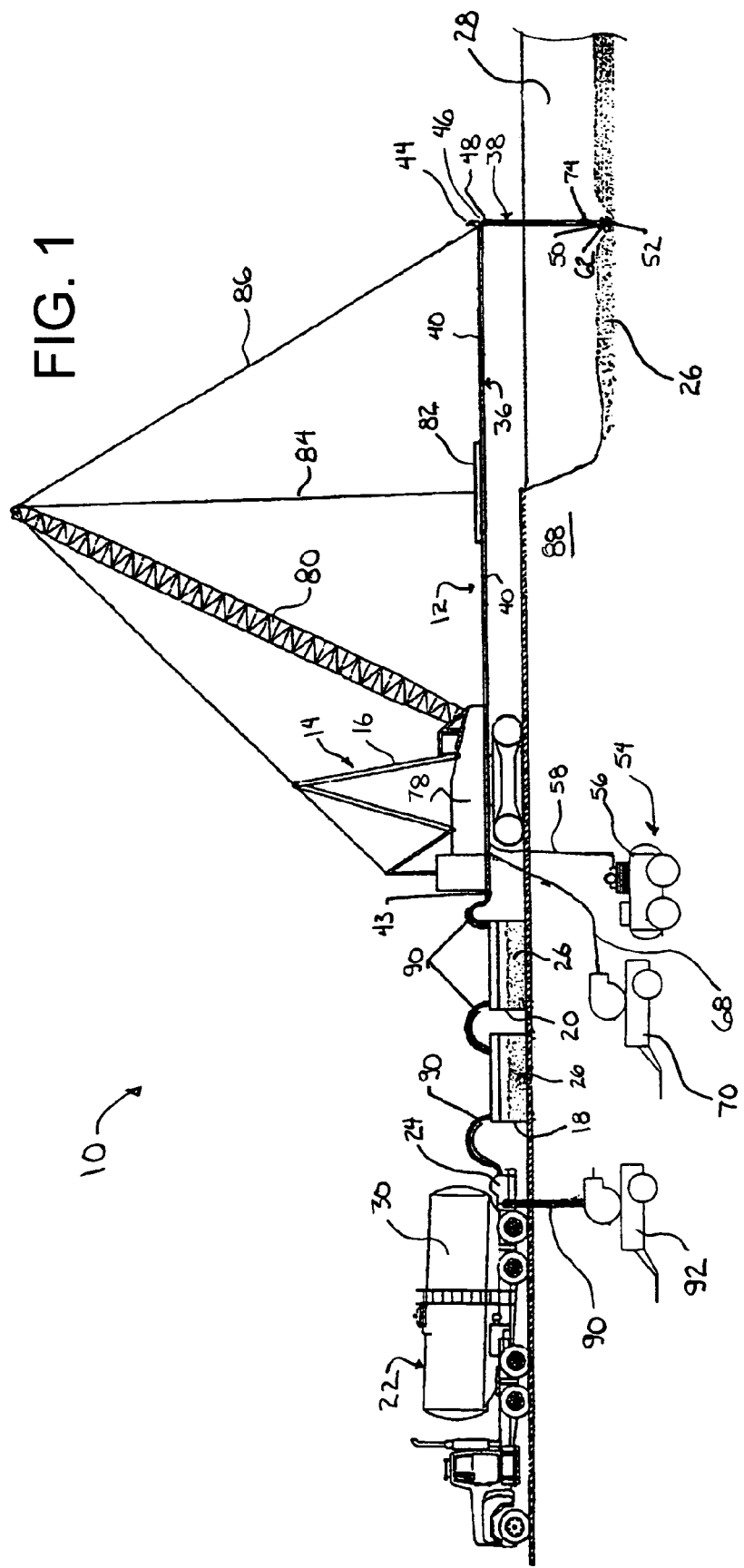
FIG. 1 is a side elevation view illustrating a sediment removal system in accordance with the present invention.

A sediment removal system 10 in accordance with the present invention is illustrated in FIG. 1 for removing sediment located beneath water or contaminated liquid. Sediment removal system 10 is adapted to remove sediment while limiting or prohibiting the amount of turbidity generated in the water. As such, the material that has settled to the bottom of the water or liquid is generally prohibited or limited from being stirred into suspension, thus allowing more of the sediment to be removed and preventing further contamination of the water or liquid.

Sediment removal system 10 is adapted for use in removing sediments located within flowing waterways, such as rivers, streams, channels, canals, or via ducts. Sediment removal system 10 is also adapted for use in non-moving bodies of water, such as ponds, lakes, aeration basins, or sedimentation lagoons. The following description of sediment removal system 10 will refer to the fluid within which the sediment is located as water for ease of discussion. However, it should be understood that sediment removal system 10 is well adapted for use in water, water based liquids that are contaminated with chemicals or toxins, or other non-water fluids.

Sediment removal system 10 generally includes a suction conduit 12, a moveable support device 14, which in the preferred embodiment shown is a crane 16 adapted to support suction conduit 12, two sediment retention containers 18, 20, and a vacuum truck 22. Vacuum truck 22 includes a high pressure suction pump 24 that enables sediment 26 and water 28 to be drawn through the suction conduit 12 and through the sediment retention containers 18, 20 and into the tank 30 of truck 22. Sediment 26 is retained within containers 18, 20, in the manner described below, such that generally only water or water and suspended solids are contained within tank 30. As described in more detail below, suction conduit 12 is provided with air nozzles 32 that direct pressurized air into a flow path 34 of the suction conduit 12 and thus enable suction conduit 12 to remove sediments 26 from depths 53 greater than twenty-nine feet below the relative elevation of suction pump 24.

Figure 3:
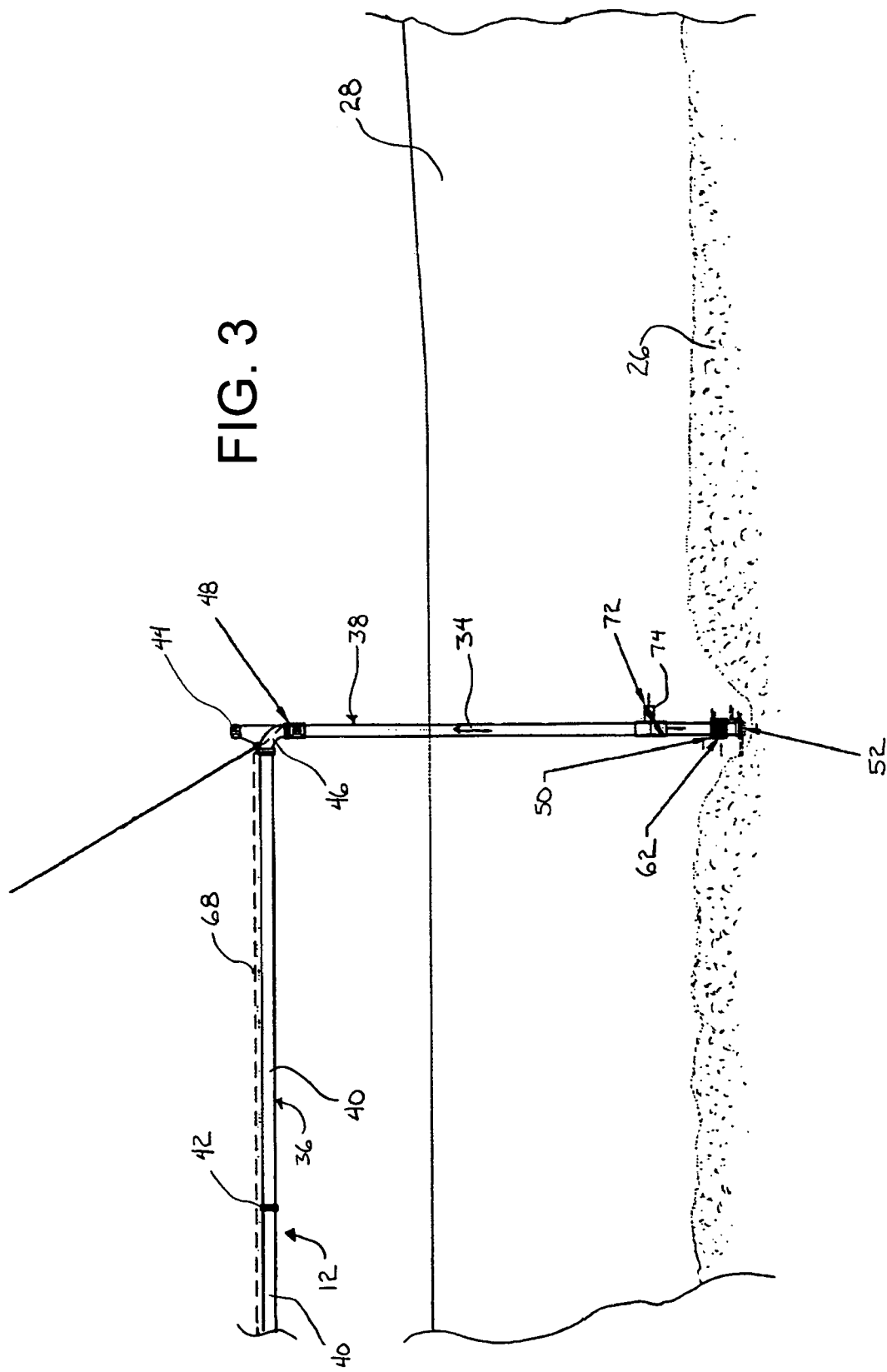
FIG. 3 is a side elevation view of the suction conduit of FIG. 1.
Figure 4:
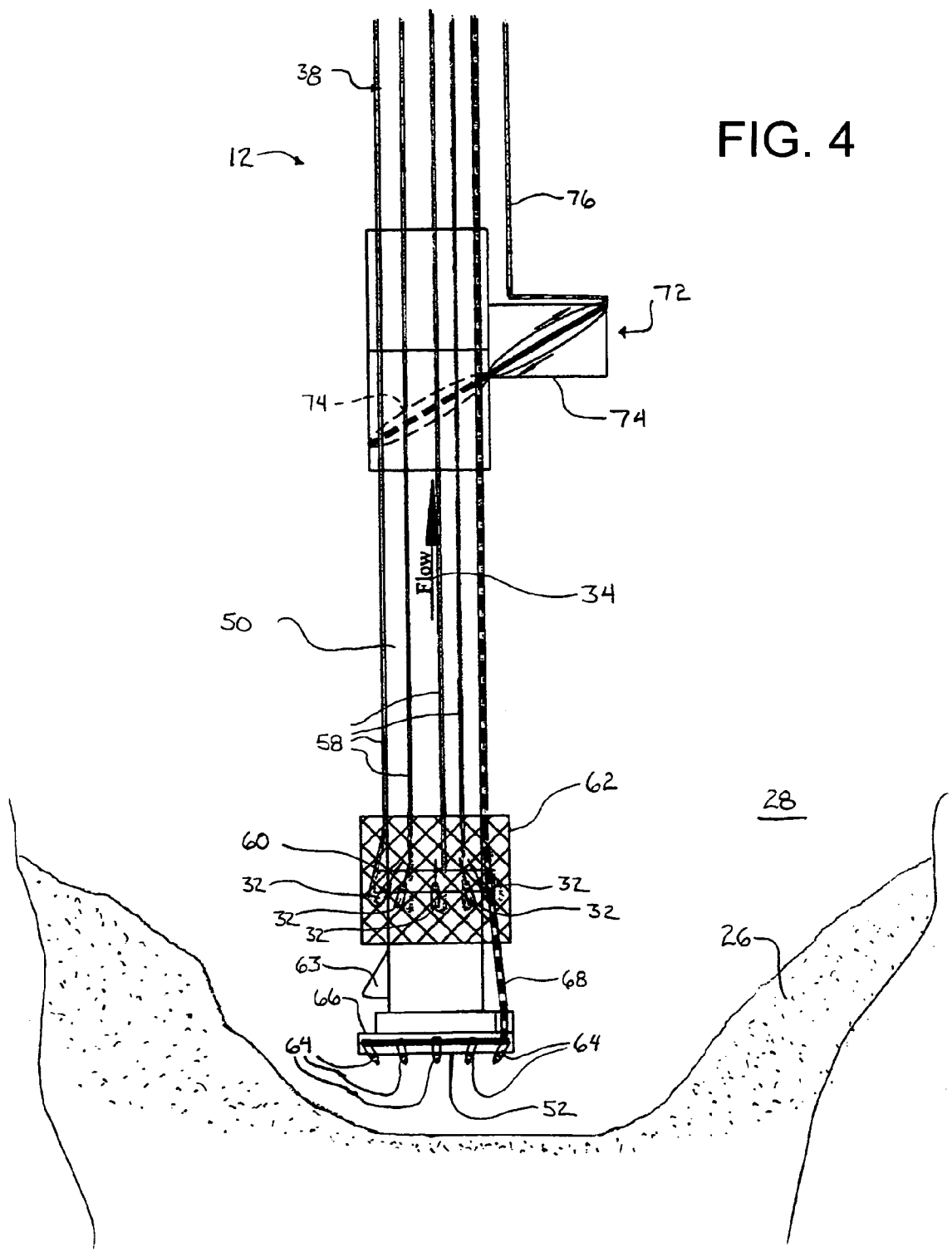
FIG. 4 is a side elevation view of the inlet portion of the suction conduit of FIG. 3.

In the illustrated embodiment, suction conduit 12 is constructed of metallic, eight inch vacuum pipe. It should be appreciated, however, that pipe of larger or smaller diameter may also be used to remove sediment 26. As shown in FIGS. 1 and 3, suction conduit 12 is substantially L-shaped and includes a first member 36 and a second member 38, where first member 36 is adapted to be extended over the surface of water 28 in a generally horizontal orientation and second member 38 is inserted into water 28 in a generally vertical orientation. As shown in FIG. 3, first member 36 is constructed of multiple lengths of straight pipe sections 40 connected together at joints 42. First member 36, therefore, may be readily configured to different lengths depending upon the size of the body of water 28 from which sediments 26 are being removed and upon any surrounding structural constraints. First member 36 also includes an isolation valve 43 distal from intersection 46 that can be used to prevent water 28 and sediment 26 contained within suction conduit 12 from spilling out when not attached to retention containers 18, 20. Second member 38 includes, as shown in FIGS. 3 and 4, an inlet portion 50 and an inlet opening 52. Sediment 26 and water 28 are drawn into inlet opening 52 by suction pump 24, as described below, creating a flow path 34 within suction conduit 12.

A global positioning satellite (GPS) receiver 44 is shown at the intersection 46 of first and second members 36, 38 in FIG. 3. GPS receiver 44 may be adapted to send a position signal to either the operator in crane 16 or to a position plotter, such as a computer, (not shown), thereby enabling tracking of the locations within water 28 from which sediment 26 has been removed. FIG. 3 also discloses a relief valve 48 located near intersection 46, the operation of relief valve 48 being described below.

Figure 5:
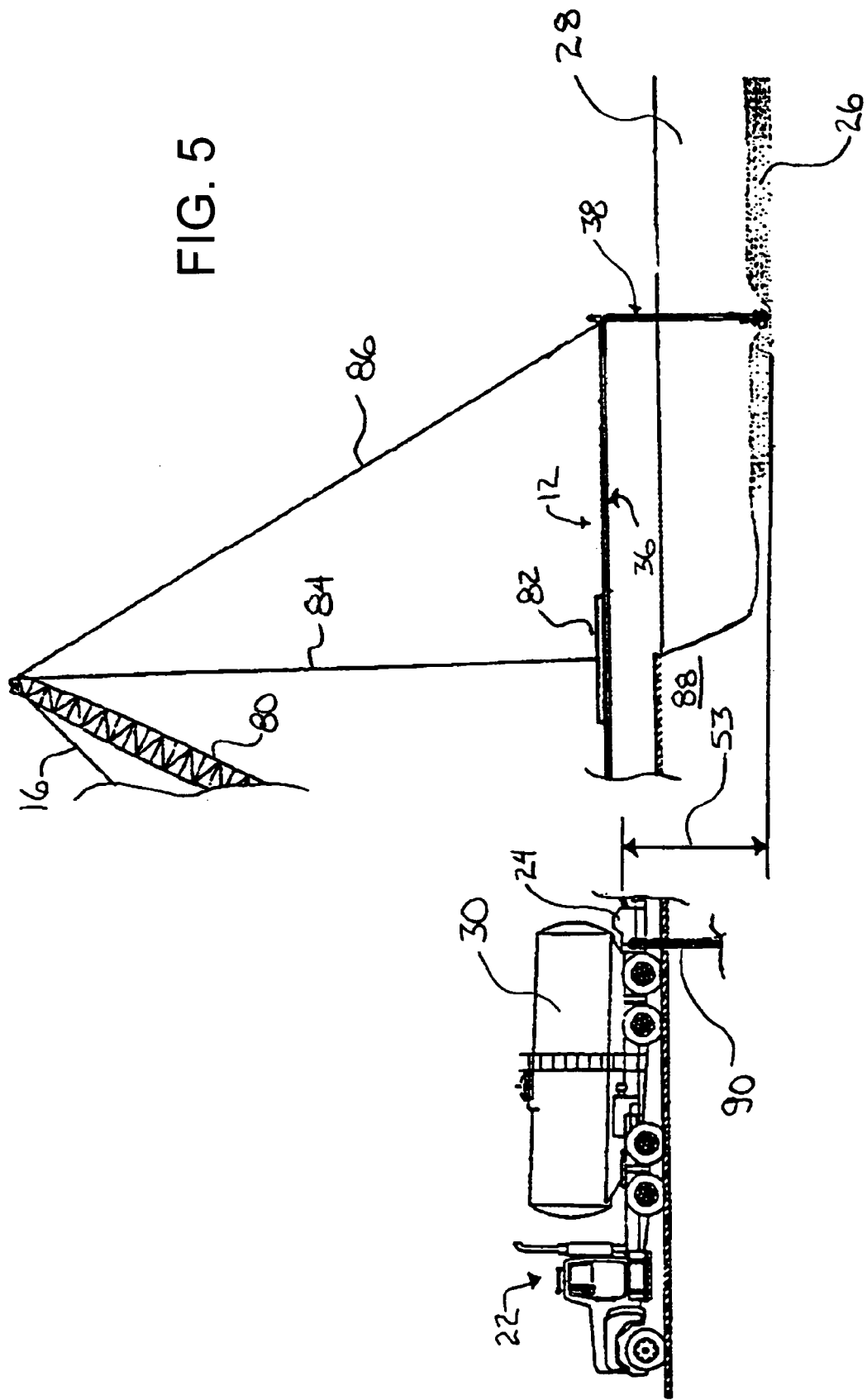
FIG. 5 is a side elevation view illustrating the relative orientation of the suction pump to the inlet opening of FIG. 1.

As noted above, sediment removal system 10 also includes air nozzles 32 on inlet portion 50. Multiple air nozzles 32 are positioned circumferentially around inlet portion 50 of second member 38 approximately 1 to 1.5 feet above the inlet opening 52 relative to the flow path 34. Air nozzles 32 are mounted through the wall of second member 38 to inject pressurized air into the flow path 34 within the internal diameter of second member 38. Air nozzles 32 are oriented to direct the injected pressurized air upwards relative to flow path 34. The injection of pressurized air into flow path 34 enables sediment removal system 10 to remove sediment 26 from depths 53 greater than twenty-nine feet relative to the vertical location of suction pump 12, as understood from FIG. 5, by providing added lift to the column of water and sediment within second member 38. The inclusion of air along with the water 28 and sediment 26 in flow path 34 also provides an additional benefit to the suction pump 24 of vacuum truck 22 as such pumps may often require a portion of air in the fluid being drawn there through for proper operation.

Pressurized air is supplied to air nozzles 32 by an air supply device 54, which in the illustrated embodiment is an air compressor 56, as shown in FIG. 1, adapted to supply air at a volumetric rate of between 185 and 300 cubic feet per minute. FIG. 4 discloses individual air lines 58 extending along second member 38 to each air nozzle 32, with the air nozzles 32 being affixed to a mounting ring 60. Alternatively, fewer air lines 58 or a single main line could supply pressurized air to a plenum or manifold, with the individual air nozzles 32 being connected to such structure. Shroud 62 surrounds the air nozzles 32 to protect them from potential damage that could be caused if inlet portion 50 were to inadvertently strike a submerged object. As illustrated in FIG. 4, a fin 63 may be attached to the outside of inlet portion 50 to provide further control of inlet opening when moving second member 38 within water 28 or if water 28 includes a current. Although only one fin 63 is illustrated, multiple fins may alternatively be provided with the fins being either manually or remotely and automatically adjustable.

Figure 2:
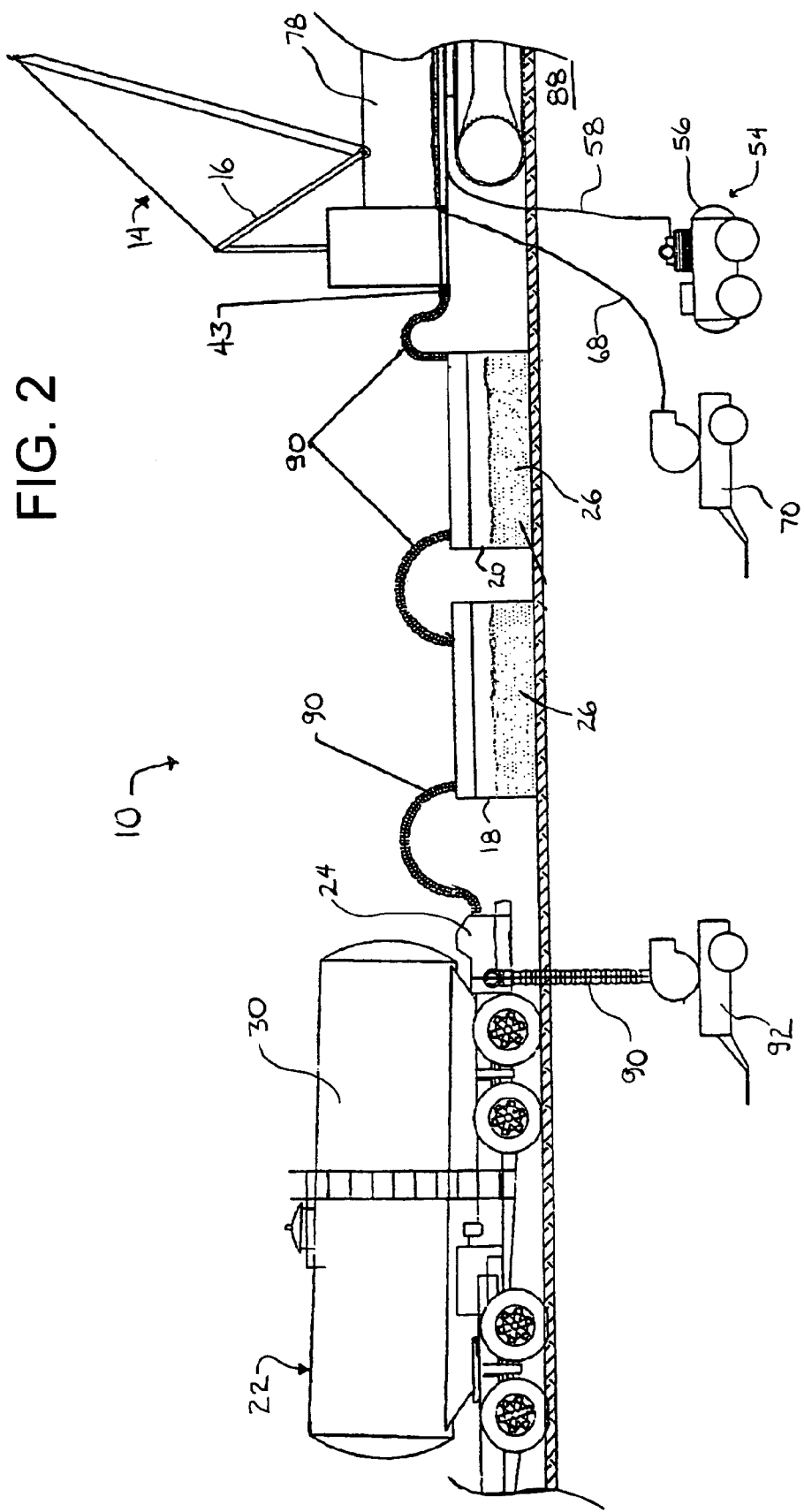
FIG. 2 is a side elevation view of the vacuum truck, retention containers, and pumps of the sediment removal system of FIG. 1.

Water nozzles 64 mounted to nozzle ring 66 are located at inlet opening 52, as shown in FIG. 4. Nozzle ring 66 functions as a high pressure water gallery or manifold and is supplied with high pressure water through water line 68 by a high pressure water pump or water blaster 70 that is shown in FIGS. 1 and 2. Water pump 70 is adapted to supply water to water nozzles 64 at pressures of between 1,000 to 40,000 psi. In the illustrated embodiment, water nozzles 64 are oriented downwards and inwards relative to flow path 34 and function to break-up or dislodge sediment 26 that has become compacted or hardened or conglomerated. By directing water nozzles 64 in a downward and inward orientation relative to flow path 34, dislodged sediment 26 is prevented or limited from pluming out beyond inlet opening 52 and creating turbidity in the water.

FIG. 4 also discloses that a restrictor or valve or restrictor valve or stop valve 72, which in the illustrated embodiment is a knife valve 74, is affixed to inlet portion 50, and positioned approximately two to four feet above inlet opening 52. Knife valve 74 has two positions, an open position and a closed position. In the closed position, knife valve 74 blocks flow path 34 and in the open position flow path 34 is clear. The position of knife valve 74 is controlled by air supplied by air compressor 56 through air line 76 to an air over piston arrangement, where knife valve 74 is in the open position when supplied with air. Knife valve 74 functions to prevent backflow out of suction conduit 12 when air compressor 56 is turned off. Therefore, when air is no longer provided to knife valve 74, knife valve 74 closes and the column of water remaining in suction conduit 12 is prevented from flowing back out of inlet opening 52 and creating turbidity. Although illustrated as an air operated knife valve 74, it should be understood that restrictor 72 may be alternatively constructed in accordance with the present invention and still function as intended and may or may not be air operated. For example, an alternative restrictor could be constructed as one or more floating check valves.

Although not shown, second member 38 may include depth marks starting at the inlet opening 52 and extending upwards towards intersection 46. Such depth marks make it possible to gage the depth from the surface of the water 28 to the sediment bed 26.

Crane 16, as shown in FIG. 1, includes a base 78, a boom 80, and a support member 82 that is suspended from boom 80 by cable 84. Suction conduit 12 is further attached to boom 80 by cable 86 at intersection 46. Base 78 is adapted to move on land 88 and, in conjunction with boom 80, functions to position the inlet opening 52 of suction conduit 12 along the sediment bed 26. In the illustrated embodiment, suction conduit 12 is not connected or supported directly to base 78 of crane 16 in order to avoid improper loading of base 78, which could result in damage to crane 16. For example, suction conduit 12 may become quite heavy, particularly when first member 36 is constructed to be quite long and extended a considerable distance over the water 28. Furthermore, if sediment removal system 10 is used to remove sediment 26 from a flowing waterway, the current will generate horizontal forces on second member 38.

These forces, in turn, will create torque moments about first member 36, thus making it more difficult to control the positioning of inlet portion 50 within the waterway if suction conduit 12 were connected to or supported by base 78, as well as increase the potential for damage to crane 16.

In the illustrated embodiment, support member 82 is formed from an I-beam and is approximately 20 feet in length. Support member 82 is attached to first member 36 by shackles (not shown) secured to tabs or dog ears (not shown) located on first member 36. The structural rigidity of support member 82 provides support to the span of first member 36 by reducing the distance between unsupported portions of first member 36. The use of support member 82 thereby limits the amount of bending that will occur on first member 36 as compared to single point attachment of cable 84 to first member 36. It should be understood that support member 82 may be constructed of alternative lengths and profiles and still function to provide support to first member 36. For example, support member 82 could be constructed of either a shorter or longer C-channel or half-pipe type beam that was affixed either above or below first member 36.

Sediment removal system 10 is disclosed in FIG. 1 as utilizing only one support member 82, it should also be appreciated that multiple support members 82 could be suspended from boom 80 by multiple cables 84 and affixed to first member 36. Such a construction would further reduce the unsupported length of first member 36 and/or enable suction conduit 12 to be positioned further away from the land 88 upon which base 78 of crane 16 is positioned. This is significant in that various sizes of cranes 16 may be used with sediment removal system 10 to support longer suction conduits 12 in order to reach further out into water 28.

Figure 6:
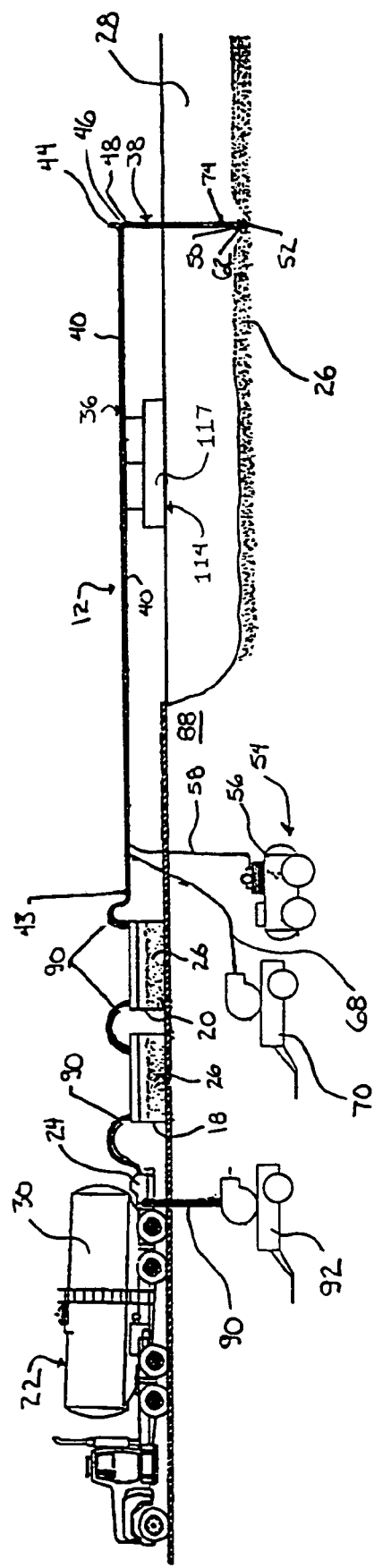
FIG. 6 is a side elevation view of a sediment removal system in accordance with the present invention illustrating an alternative support device from that shown in FIG. 1.
Figure 7:
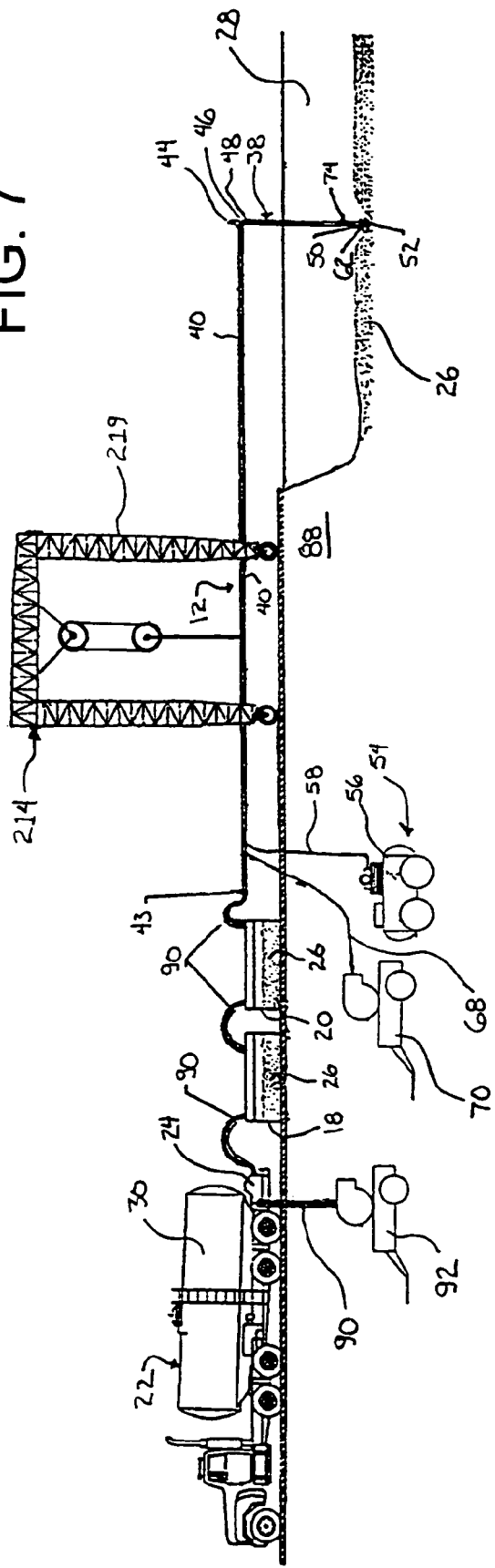
FIG. 7 is a side elevation view of a sediment removal system in accordance with the present invention illustrating an alternative support device from that shown in FIG. 1.

Sediment removal system 10, as illustrated in FIGS. 6 and 7, may also employ alternative support devices 114 and 214 for movably supporting suction conduit 12 for removal of sediment 26. For example, as illustrated in FIG. 6, suction conduit 12 may be placed on a powered or un-powered floating vessel 117. When the floating vessel 117 is un-powered, such as a barge, it would be necessary to provide a method of moving the vessel 117, for example, with a tugboat or a land based device connected to the barge. Floating vessel 117 may also be used to support a crane, such as crane 16 discussed above, which would enable further control of inlet portion 50. If a large enough floating vessel were utilized, the sediment retention containers 18, 20, suction pump 24, and tank 30 of sediment removal system 10 could also be located on the floating vessel.

FIG. 7 illustrates another example of a support device 214 disclosed as a gantry or gantry crane 219 that may be used in connection with the sediment removal system of the present invention. Gantry 219 may be constructed to move the suction conduit 12 in a vertical and horizontal orientation relative to the water 28 and, in order to move adjacent to water 28, may be self-propelled or caused to move by a separate device. Additionally, further alternative types of construction equipment may be used as a support device in place of crane 16 such as, for example, an excavator (not shown).

First and second retention containers 18, 20 are serially connected to suction conduit by eight inch flexible hosing 90. Air, water, and sediment drawn through the suction conduit 12 flows through a flexible hose 90 and into second retention container 20. From there, the mixture is drawn through another flexible hose 90 and into the first retention container 18. Retention containers 18, 20, as should be understood, are sealed such that vacuums may be created within the containers 18, 20 by suction pump 24. Retention containers 18, 20 serve as settling vessels for solids and thus function to retain solid sediments 26 removed from the body of water 28. Notably, the velocity with which the air, water 28, and sediment 26 slurry enters the retention containers 18, aids in driving out water 28 entrained in the solid sediments 26. Once full, or upon completion of a particular project, retention containers 18, 20 may be transported for proper disposal or treatment at a separate facility. Although hose 90 is disclosed as being constructed of eight inch flexible hosing, it should be understood that hosing of larger or smaller diameter may also be used to convey air, water, and sediment.

Suction pump 24 also functions to draw the water 28 out of first retention container 18 through flexible hose 90 and discharge the water 28 into tank 30 of vacuum truck 22. Although referred to as water 28, it should be understood that the water 28 removed from first retention container 18 may contain some portion of sediment 26 suspended within the water 28. Therefore, depending upon the application, the water 26 pumped into tank 30 may need further treatment. If offsite treatment is required, vacuum truck 22 is adapted to transport the contents of tank 30. A removal pump 92 may be used to remove the water 28 from tank 30 and transport it to a treatment facility, another tank, or the like.

In the illustrated embodiment, suction pump 24 and tank 30 are included on vacuum truck 22. It should be understood, however, that alternative arrangements for suction pump 24 and tank 30 may be used. For example, a suction pump 24 that is not attached to a vacuum truck 22 may be used to remove sediment 26 from a body of water 28, with the water 28 that is drawn out of first retention container 18 being pumped into a separate tank, retention pond, or even back into the original location from which it was drawn.

In operation, crane 16 submerges second member 38 into water 28 to the appropriate depth while relief valve 48 is in an open position and knife valve 74 is closed. Upon activating suction pump 24 and air compressor 56, relief valve 48 is closed and knife valve 74 is opened. Air is injected into flow path 34 and water 28 and sediment 26 are then drawn into suction conduit 12. If needed, high pressure water may be discharged out of water nozzles 64 to dislodge sediment 26 that has hardened or conglomerated.

Sediment removal system 10 provides a versatile and controllable device that is able to remove sediment 26 from water 28 in a focused and controlled manner that avoids generating unwanted turbidity. GPS receiver 44 enables even greater control and focus of the operation and knife valve 74 further prevents turbidity when sediment removal system 10 is shut down. The inclusion of air nozzles 32 on inlet portion 50 enables sediment 26 to be removed from depths greater than twenty-nine feet relative to the location of suction pump 24 and the inclusion of water nozzles 64 on inlet opening 52 enables hardened sediment 26 to be dislodged such that it may be drawn into sediment removal system 10. The capturing of solid sediment 26 by retention containers 18, 20 and the capturing of water 28 containing suspended sediment by tank 30 enables the sediment 26 and water 28 to be transported to an appropriate location for treatment or disposal.

The above is a description of the preferred embodiments. One skilled in the art will recognize that changes and modifications may be made without departing from the spirit of the disclosed invention, the scope of which is to be determined by the claims which follow and the breadth of interpretation that the law allows.

The embodiments of the invention in which I claim an exclusive property right or privilege are defined as follows:

1. A sediment removal system for removing sediment from a body of water, said sediment removal system comprising:
   a suction conduit, said suction conduit having an inlet portion and an inlet opening;
   at least one retention container, said at least one retention container adapted to retain sediment removed from a body of water;
   a suction pump, said suction pump adapted to draw sediment and water through said suction conduit and into said at least one retention container;
   a support device, said support device adapted to movingly support said suction conduit such that said inlet portion is selectively positionable within a body of water;
   an air supply device;
   at least one air nozzle;
   a water pump; and
   at least one water nozzle;
   said at least one air nozzle being located proximate said inlet portion and adapted to inject air from said air supply device into a flow path of said suction conduit, and wherein said at least one water nozzle is affixed to said inlet portion proximate said inlet opening, said water pump and said water nozzle being operable to discharge pressurized water directed at a sediment bed.

2. The sediment removal system of claim 1, wherein said water pump is positionable remote from said water nozzle and is adapted to supply said nozzle with pressurized water at pressures up to approximately 40,000 psi.

3. The sediment removal system of claim 1, further including first and second retention containers, wherein said suction pump flowingly draws sediment and water from said second retention container into said first retention container.

4. The sediment removal system of claim 1, further including a tank, wherein said suction pump is operable to discharge water drawn through said suction conduit and said at least one retention container into said tank.

5. The sediment removal system of claim 1, further including a restrictor operatively affixed to said suction conduit, said restrictor being adapted to prevent at least a portion of water and sediment within said suction conduit from flowing out of said inlet opening.

6. The sediment removal system of claim 1, further including a GPS receiver, said GPS receiver being affixed to said suction conduit and adapted to monitor the location of said inlet opening within the flowing waterway.

7. The sediment removal system of claim 1, wherein said support device is at least one chosen from a crane, a floating vessel, and a gantry.

* * * * *